United States Patent
Weedlun

(10) Patent No.: US 9,586,435 B2
(45) Date of Patent: Mar. 7, 2017

(54) PERFORMANCE FABRIC APPLIQUÉS

(71) Applicant: Paul Weedlun, Ellicott City, MD (US)

(72) Inventor: Paul Weedlun, Ellicott City, MD (US)

( * ) Notice: Subject to any disclaimer, the term of this patent is extended or adjusted under 35 U.S.C. 154(b) by 34 days.

(21) Appl. No.: 14/509,650

(22) Filed: Oct. 8, 2014

(65) Prior Publication Data
US 2015/0099099 A1   Apr. 9, 2015

Related U.S. Application Data

(60) Provisional application No. 61/888,261, filed on Oct. 8, 2013.

(51) Int. Cl.
| | |
|---|---|
| *B32B 3/10* | (2006.01) |
| *B44C 1/17* | (2006.01) |
| *B32B 38/00* | (2006.01) |
| *D06Q 1/12* | (2006.01) |
| *B32B 37/12* | (2006.01) |

(52) U.S. Cl.
CPC ........ *B44C 1/1712* (2013.01); *B32B 38/0004* (2013.01); *D06Q 1/12* (2013.01); *B32B 37/12* (2013.01); *B32B 38/145* (2013.01); *B32B 2305/188* (2013.01); *B32B 2437/00* (2013.01); *Y10T 156/1074* (2015.01); *Y10T 428/24777* (2015.01)

(58) Field of Classification Search
CPC .............................................. Y10T 428/24777
See application file for complete search history.

(56) References Cited

U.S. PATENT DOCUMENTS

| | | | |
|---|---|---|---|
| 8,354,154 B2 | 1/2013 | Mason et al. | |
| 2009/0075075 A1* | 3/2009 | Abrams | D06P 5/004 428/354 |
| 2009/0089911 A1* | 4/2009 | Smith | A41D 3/04 2/69 |

* cited by examiner

*Primary Examiner* — Bruce H Hess
*Assistant Examiner* — Christopher Polley
(74) *Attorney, Agent, or Firm* — Baker, Donelson, Bearman, Caldwell & Berkowitz, PC; Royal W. Craig

(57) ABSTRACT

An appliqué comprising an outer perimeter fabric frame of a particular weave, fiber composition and cut, coated with a laminating adhesive, and inlayed with a central fabric panel formed of mesh or other perforated or highly porous material. Lamination causes the adhesive to melt through the mesh central panel and bond the two layers to an underlying performance fabric substrate. The resulting appliqué forms a robust and launderable bond, but does not substantially change the physical and visual characteristics of a performance fabric substrate to which the appliqué is applied. Moreover, a layered embroidery appearance can be created by contrast coloring the fabric frame versus central fabric panel, and this is further enhanced by printing a multi-color graphic along the periphery of the fabric frame.

22 Claims, 2 Drawing Sheets

PERFORMANCE FABRIC APPLIQUÉS

CROSS-REFERENCE TO RELATED APPLICATION

The present application derives priority from U.S. Provisional Application Ser. No. 61/888,261 filed Oct. 8, 2013.

BACKGROUND OF THE INVENTION

1. Field of the Invention

The present invention relates to heat activated transfers and appliqués and, particularly, to a light-weight breathable heat-transfer comprised of numbers, letters, logos, graphics, and other indicia which do not change the physical and visual characteristics of performance fabrics to which they are applied, including breathability, moisture-wicking characteristics, stretch and recovery, and launderability.

2. Description of the Background

Manufacturers of performance apparel, uniforms, swimwear, and sports accessories use various methods to apply a variety of indicia, such as text, numbers, logos, graphics, and other indicia, to garments and textiles for decoration and identification, among other things. Common application technologies include silk-screening, screen-printing, sonic welding, direct embroidery, and heat activated transfers.

Silk-screening of logos or emblems is commonly used, but this process does not result in a product that withstands repeated stretching, and is complex and time-consuming. In addition, the designs created by silk-screening are flat, lack texture, and do not withstand repeated stretching or industrial or home washings. Consequently, many companies prefer embroidery as their primary method for applying decoration and identification.

Sonic welding is another method used to apply decoration and identification to garments and textiles. The nature of a sonic-welded bond is a fusing of materials which results in a rigid material interface. The rigid interface causes cracking and potential sheering when stretched, and can debond after repeated home and industrial laundering. Sonic welding allows texturing, but also requires chemical compounds that some companies find unacceptable. Moreover, sonic welding requires the creation of unique, expensive special dies for any design to be applied. Consequently the process is slow, relatively expensive, and not well-suited for the performance apparel industry and its small-batch production/quick-changeover requirements. Indeed, this process typically is not used by the uniform industry for these reasons. Embroidery has instead become the primary method for applying decoration and identification.

Embroidery is typically performed by a machine that applies stitching of various colors and styles to fabric to create a design. Embroidered designs have a much greater aesthetic value, and stand repeated home and industrial launderings. Yet this too is a complex, time-consuming process. While appliqués stitched have more potential to stretch mechanically then welded bonds they are still limited by the sewn threads which constrain elongation and can break if stretched.

Thermally activated adhesive coatings are also used to apply appliqués to garments and textiles. One common type of appliqué, typical of sports jersey and uniform, numbering and lettering, is a layered appliqué comprising a solid first base layer that defines a numeral or letter and one or more top layers that are the same shape, but smaller than the layer below it, thereby creating a three dimensional appearance. Typically, each additional top layer is stitched to the layer below it. On the back of the solid base layer is a layer of thermally activated adhesive that covers the entire back surface. The solid fabric layers in combination with the solid adhesive coating result in a rigid, thick and relatively heavy, and moisture/air impermeable appliqué. Thus, when such an appliqué is applied to a substrate that is more flexible, lighter, or more breathable than the appliqué itself, the substrate's characteristics are lost.

The destruction or interference with the characteristics of the underlying fabric is a significant disadvantage, especially in the context of performance apparel with moisture-wicking and/or breathability characteristics, because the appliqué undermines the garment's comfort and performance. In addition to unfavorably changing the physical characteristics of the substrate, these appliqués also change the substrate's visual characteristics, such as the amount of drape. Another problem to overcome particularly in contact sports such as football and hockey is the potential for the garment and appliqués to be pulled causing a sheer which can break the bond between garment and appliqué whether sewn or adhered with an adhesive.

It would be greatly advantageous to provide a heat sealed appliqué that can be applied to any garment or textile without obstructing any performance characteristics of the garment or textile, and which is therefore particularly well-suited for lightweight, breathable and/or moisture-wicking textiles commonly used in performance sports apparel.

SUMMARY OF THE INVENTION

It is, therefore, an object of the present invention to provide a heat sealed appliqué forming indicia such as text, numbers, logos, graphics, and other indicia that does not change the physical characteristics, such as stiffness, pliability, breathability, stretch and recovery, moisture-wicking properties, weight, or launderability of a performance fabric substrate to which the appliqué is applied.

It is another object of the present invention to provide a heat sealed appliqué that does not change the visual characteristics, such as drape, of the substrate to which the appliqué is applied.

It is yet another object of the present invention to provide a heat sealed appliqué that resembles a traditional, layered appliqué often used for lettering and numbering on sports jerseys and uniforms.

And it is another object of the present invention to provide a heat sealed appliqué that can be manufactured cost effectively.

According to the present invention, the above-described and other objects are accomplished, by an appliqué comprising an outer perimeter fabric frame of a particular weave, fiber composition and cut pattern, the fabric frame having a thermally activated adhesive coating on one side. The fabric frame is cut (for example, die-cut, laser-cut, rotary-blade-cut, water-jet cut or otherwise cut) from a blank in the form of an outline of a discrete predetermined indicia (text, number, logo, graphic, etc.). The cut pattern comprises an inner cut and conforming outer cut of slightly expanded dimension that results in a substantially contiguous border framing the desired indicia. A central fabric panel formed of mesh or other perforated or highly porous material is cut with a single cut conforming to those of the fabric frame, but of dimensions intermediate to those of the inner cut and conforming outer cut of the fabric frame. Dimensions are structurally important, especially the following dimensional parameters for the central fabric panel relative to the fabric frame: 1) the inner and outer cut of the fabric frame are identical but scaled; 2) the width of the inner cut of the fabric frame is at all points constrained to be smaller than the width of the central, fabric panel (measured in the same direction); and 3) the difference between the outer cut and inner cut of ore fabric frame (e.g., the width of the border or margin) is constrained to a maximum percentage of the total width of the appliqué (measured in the same direction). The fabric frame is adhered by a particular thermally activated adhesive coating to an underlying performance fabric substrate, effectively sandwiching the central fabric panel (substantially unadhered) there between and overtop the substrate. The adhesive flows through the mesh of the central panel bonding both layers, and yet the bonded appliqué does not substantially affect the flexibility, breathability, and weight of the underlying substrate because it is only around the narrow outer perimeter of the appliqué. Moreover, both the fabric frame and its thermally activated adhesive coating have the ability with the particular adhesive type (described below) to stretch and recover as the garment is pulled, which prevents the adhesive bond from sheering (a common cause of numbers or characters detaching from the garment). The resulting appliqué forms a robust and launderable bond, but does not substantially change the physical and visual characteristics of the substrate to which the appliqué is applied. Moreover, since the outer periphery of the fabric frame is slightly larger than the central fabric panel, the frame remains visible. A layered embroidery appearance can be created by contrast coloring the fabric frame versus central fabric panel, and this is further enhanced by printing multiple color graphics along the periphery of the fabric frame.

The following is a non-limiting example of a suitable process for manufacturing the appliqué described above. The appliqué can be manufactured by applying a thermally activated adhesive layer to one side of a first fabric blank. The coated first fabric blank is kiss cut to form a predetermined indicia pattern that is preferably a discrete letter, number, logo or other indicia. In addition to the indicia pattern, a conforming outline cut of slightly larger dimension is made through, me coated perimeter textile and the carrier sheet. The inner excess perimeter textile is removed to form an opening in the shape of the indicia pattern.

A central fabric panel formed of mesh or other perforated or highly porous center textile, a separate textile, is cut in conformance with the opening in the fabric frame, but using a dimension which will be wider than the inner cut used for the fabric frame. The cut central fabric panel is inlayed within the opening in the perimeter frame, against the thermal adhesive layer, very slightly overlapping the interior cut of the fabric frame. The perimeter frame is bonded to the performance fabric, sandwiching the central panel there between, and the two are bonded thereto by heat pressing, on top and bottom, which partially melts the adhesive coating on the perimeter frame through the mesh central panel and to the substrate.

To apply the appliqué, the backing material underneath is removed, and the appliqué is placed on the garment and heat pressed to activate the adhesive coating. Using this process, the appliqué only has an adhesive layer around its outer perimeter, leaving the center portion mostly uncoated.

BRIEF DESCRIPTION OF THE DRAWINGS

Other objects, features, and advantages of the present invention will become more apparent from the following detailed description of me preferred embodiments and certain modifications thereof when taken together with the accompanying drawings in which.

DETAILED DESCRIPTION OF THE PREFERRED EMBODIMENT

The present invention is a light-weight breathable heat-transfer comprised of individual numbers, letters, logos, graphics, and other indicia. The transfer will not change or impede the physical characteristics of performance fabrics to which they are applied, including breathability, moisture-wicking characteristics, stretch and recovery, and launderability.

Figure 1:
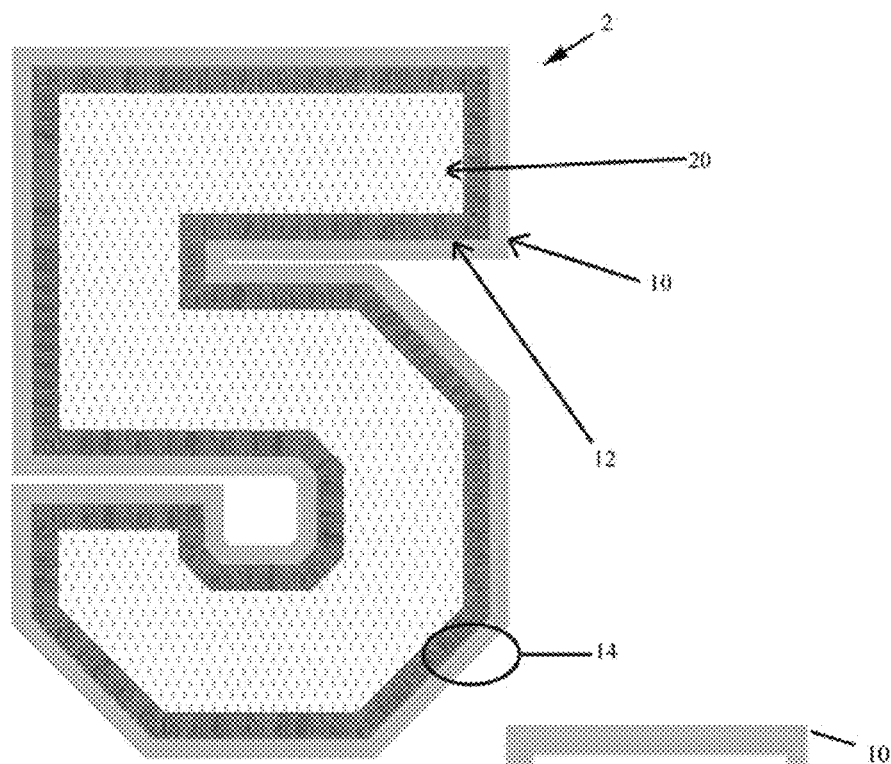
FIG. 1 is a front view of a heat-activated appliqué 2 according to an embodiment of the present invention.
Figure 2:
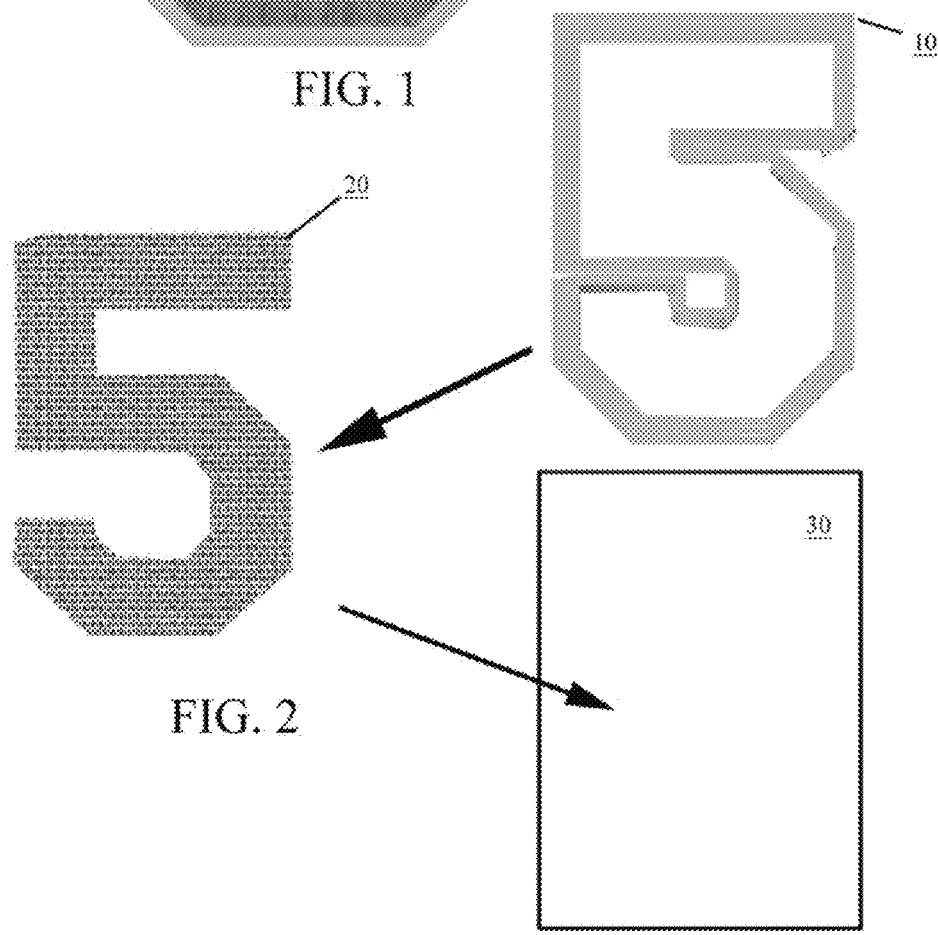
FIG. 2 is a front composite view of the heat-activated appliqué 2 as in FIG. 1.
Figure 3:
FIG. 3 is a side view of the heat-activated appliqué 2 as in FIG. 1.
Figure 4:
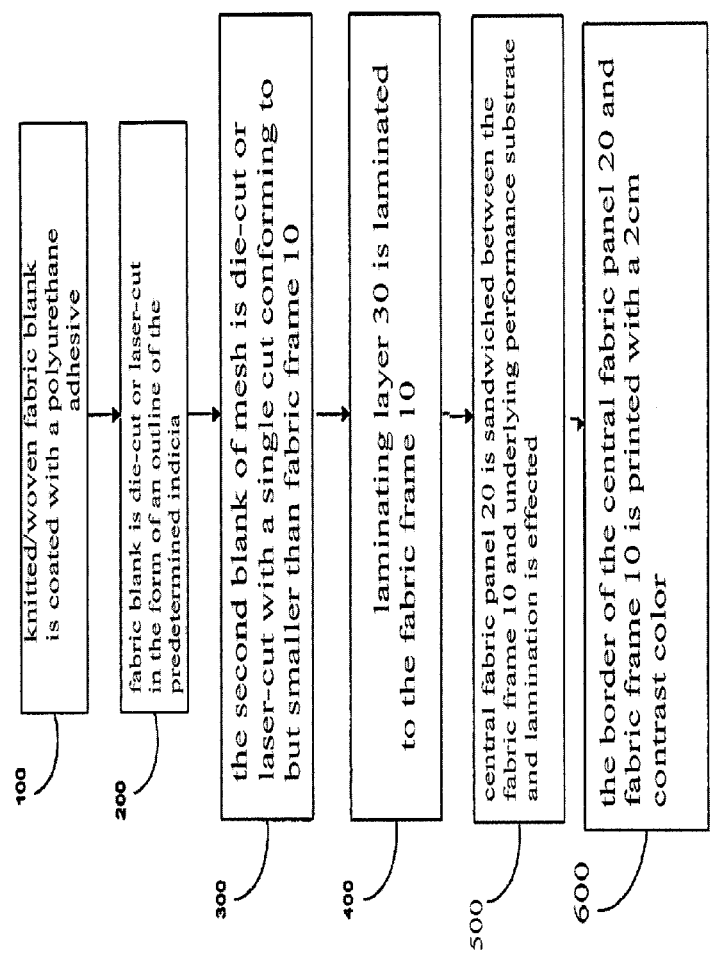
FIG. 4 is a flow chart illustrating the construction steps for manufacture of the heat-activated appliqué 2.

FIG. 1 is a front view of a heat-activated appliqué 2 according to an embodiment of the present invention. The appliqué 1 portrays a preselected numeric indicia (here a "5" in wide block script). FIG. 2 is a front composite view of the heat-activated appliqué 2 of FIG. 1 and FIG. 3 is a side view.

The appliqué 2 comprises a fabric frame 10 that is cut (die-cut, laser-cut, rotary-blade-cut, water-jet cut or otherwise suitably cut) from a first textile blank in the form of an outline of the predetermined indicia. The indicia may be any discrete text, number, logo, graphic, etc, hi general, the first blank is a knitted/woven stretchable fabric blank comprising a material having a yarn strands made of synthetic fibers, and a second elastomeric yarn strand. The first yarn strands are knitted/woven together with the elastomeric second strand to create a single blank of woven/knitted fabric. The knitted/woven blank has a specific fiber content and combination of the two strands, of yarn. The first yarn strands are preferably 100% polyester, which is the dominate fiber of the fabric blank. This is important because polyester can be colored utilizing dye sublimation printing processes which are superior in surviving deformations. Deformation of other synthetics less amenable to dye sublimation can result in sheering of color pigment from the printed product. As an alternative to polyester, the first yarn strands may comprise nylon inasmuch as it can be digitally printed utilizing acid dyes.

The elastomeric yarn strand of the knitted/woven stretchable fabric blank may be comprised of any elastic textile fiber, however, it is preferred that this material be made of the elastomeric textile fiber known as spandex. Therefore, in the preferred embodiment, the knitted/woven fabric blank comprises a blend of polyester or poly-cotton yarn and spandex, wherein the spandex fiber content is constrained to within an acceptable range of from 3 to 15%, and most preferably is 6%. This may be achieved with a knit/weave ratio of synthetic yarn/spandex yarn of from 33:1 to 20:1, and identical deniers. One skilled in the art will understand that the variation between fabric blends may also be made possible by varying the ratio of yarns and the structure of the knit or weave pattern.

The fabric frame 10 is cut (die, laser, rotary-blade, water-jet, etc.) from the finished textile blank using an inner cut and conforming outer cut of slightly expanded dimensions, that results in a substantially contiguous border framing the desired indicia. Preferably, the fabric frame 10 provides a border-width or margin within a range of from 4-8 mm across, and most preferably a 5-6 mm margin.

The fabric frame 10 is coated with a polyurethane adhesive on one side having a modulus of between 3 to 10 Newtons and a thickness of between 50 um (microns) or 0.002 inches, and 175 um or 0.007 inches. A suitable adhesive is Bemis Sewfree™ 3405 applied in a single layer 50-175 um coating applied uniformly to the perimeter. This ensures sufficient adhesive to secure the frame 10 and mesh central panel 20 together around their perimeter and to bond to the garment as well.

A central fabric panel 20 is formed from a second blank of suitable mesh or other perforated or highly porous material, most preferably a polyester or nylon mesh fabric blank. The central fabric panel 20 is cut (die, laser, rotary-blade, water-jet, etc.) from the mesh fabric blank with a single cut generally conforming to those of the fabric frame 10, but of dimensions intermediate to those of the inner cut and conforming outer cut of the fabric frame 10. Preferably, the central fabric panel 20 is cut to shape to provide a margin of overlap when superposed on fabric frame 10 within a range of from 2-4 mm across, and most preferably a 3 mm overlap margin.

Dimensions are structurally important to the present invention, and in particular there are dimensional parameters for the central fabric panel 20 relative to the fabric frame 10 (or vice versa). The parameters are as follows: 1) the inner and outer cut of the fabric frame 10 are substantially identical but scaled; 2) the width of the inner cut of the fabric frame 10 is at all points smaller than the width of the central fabric panel 20 (measured at the same point and in the same direction) by a differential of within a range of from 2-4 mm: and 3) the difference between the outer cut and inner cut of the fabric frame 10 (e.g., the width of the border) is constrained to no more than forty-five, percent of the total width of the appliqué (measured at the same point and in the same direction).

A lower laminating layer 30 underlies the fabric frame 10 for laminating the appliqué 2 to a performance fabric substrate or product. Laminating layer 30 comprises a compatible heat activated adhesive layer. Suitable thermoplastic adhesives for the present invention include methane adhesives such as Bemis Sewfree 3206D urethane films produced by Bemis Associates Inc. or similar urethane films produced by Deerfield Urethanes Inc. Laminating layer 30 preferably has a hot melt point of from 175-300 degrees F. and most preferably between 250° F.-280° F.

The central fabric panel 20 is registered to and attached beneath the fabric frame 10 facing the adhesive-coated side, and is adhered thereby to the underlying performance fabric substrate 30 in a sandwich configuration, the overlap margin allowing for a good bond between all three layers 10, 20, 30. Upon melting the laminating layer 30 flows through the mesh of the central fabric portion 30 and bonds to the underlying substrate, adhering all three layers 10, 20, 30. The foregoing attachment method provides a stretch and recovery characteristic that would not be otherwise possible, for example, by a sewn perimeter which would mechanically limit stretch and recovery at the seam.

The bonded laminating layer 30 does not substantially affect the flexibility, breathability, and weight of the appliqué 2 or the underlying substrate because it is only around the narrow outer perimeter of the appliqué on fabric frame 10. Moreover, both the fabric frame 10 and its thermally activated polyurethane adhesive coating have the ability to stretch and recover as the garment is pulled, which prevents the adhesive bond from sheering (a common cause of numbers or characters detaching from the garment). The resulting appliqué 2 provides a robust and launderable aesthetic, but does not substantially change the physical and visual characteristics of the substrate to which the appliqué 2 is applied. Moreover, since the outer periphery of the fabric frame 10 is slightly larger than the central fabric panel, both frame 10 and dye-sublimated borderline (blue) remain visible.

The color of the fabric frame 10 is preferably chosen with regard to the color of the central fabric panel 20 to contrast or accentuate those color(s), thereby providing an aesthetically pleasing color contrast and embroidered appearance. Preferably, a 3 mm margin at the edge of the central fabric panel 20 and extending onto the fabric frame 10 is printed using dye sublimation in a third color (blue is shown) to add further color contrast and accentuate the embroidered appearance.

FIG. 3 is a flow chart illustrating an exemplary sequence of construction steps for manufacture of the heat-activated appliqué 2. One skilled in the art will understand that there are suitable variations and alternatives to the above-described production process and the following is meant to serve as but one non-limiting example.

As seen in step 100, beginning with the knitted/woven fabric blank, the entire blank is coated with the polyurethane adhesive, e.g., Bemis Sewfree™ 3206D adhesive.

At step 200, the fabric blank is cut in the form of an outline of the predetermined indicia, defining fabric frame 10. One method to do this employs a digitally-controlled laser cutting system in which variable-intensify laser beam capable of high speed movement. The cutting and engraving station includes a cutting bed upon which the fabric blank is placed and having an X-Y plotter with articulating laser head thereon or a rastering laser that directs the laser beam by driving mirrors to direct the beam on the bed. The heat from the laser beam cuts selectively in a first pass to create the inner cut, and then in a second pass to create the conforming outer cut of slightly expanded dimensions.

Upon completion of cutting step 200, the laser head returns to a point of origin, allowing the user to retrieve the appliqué 2. The waste portions are removed to yield a substantially contiguous fabric frame 10 having a margin within a range of from 4-8 mm across, and most preferably a 5-6 mm margin.

At step 300, the second blank of mesh is cut (as described above) with a single cut conforming to those of the fabric frame 10 to form central fabric panel 20 with dimensions intermediate to those of the inner cut and conforming outer cut of the fabric frame 10, leaving a 2-3 cm margin of overlap as described above.

At step 400, the bonded laminating layer 30 is laminated to the fabric frame 10.

At step 500, central fabric panel 20 is sandwiched between the fabric frame 10 and underlying performance substrate, centrally, with the requisite 2-3 cm margin of overlap within frame 10. Lamination is effected. This melts the thermal adhesive layer 30 through the mesh panel 20 to the underlying performance fabric substrate; Flatbed laminating is preferred, and a suitable laminating machine is the Glenro HTH or HTM model flatbed laminator from Glenro Inc., 39 McBride Ave., Paterson, N.J. 07501-1799. These are PLC-controlled machines and the heat is set in accordance with the hot melt point range of heat sensitive polyurethane adhesive, for example, 307 degrees F. Lamination of a pressure sensitive adhesive can alternatively be used with application occurring by the use of pressure rolls or platens.

At step 600, the border of the central fabric panel 20 and fabric frame 10 is printed with a 2 cm contrast color using dye sublimation printing.

The appliqué 2 may be thermally applied to a product in a conventional manner. Electrically heated platen presses are the most commonly used means of applying the adhesive coated appliqués 1 to garments or other articles. Temperature, pressure, and dwell time are the three basic seal conditions that must be controlled in order to ensure a proper bond. These three parameters should be established for each specific garment and embroidery combination. Generally, for the preferred embodiment illustrated above the temperature is held at approximately 250 degrees F. (glueline temperature at which laminating layer 30 will melt), and this is sustained for 5-10 seconds once the temperature has been reached. Very thick materials will usually require a longer dwell time, to allow the greater mass to be heated, and to conduct the heat to the glue line. If pressure sensitive adhesives are utilized application can be accomplished by applying uniform pressure to the appliqué to adhere it to the garment. Adhesive activation can also be achieved through home ironing with a low melt activation film.

It should now be apparent that the foregoing results in a color-printed and/highlighted appliqué 2 as in FIG. 1 that gives an aesthetically-pleasing embossed or otherwise color-contrasted appearance in a form that is easily applied to a garment or other textile. Moreover, all of the printing and cutting may be controlled by common digital files, greatly increasing efficiency. This has been a description of the present invention and, the preferred embodiment of the present invention, as well as various alternate embodiments of the present invention.

I claim:

1. A thermal appliqué, comprising:
   a fabric frame cut from a fabric blank comprising a combination of pure synthetic polyester plus spandex within a range of from 3 to 15%, said fabric frame being cut with an inner cut and conforming outer cut of slightly expanded dimensions, that results in a substantially contiguous border framing a predetermined indicia;
   a coating of polyurethane adhesive on one side of said fabric frame, said coating of polyurethane adhesive having a thickness within a range of from 50-175 um, a modulus of elasticity within a range of from 3 to 10 Newtons, and a hot melt point within a range of from 175-300 degrees F.;
   a central fabric panel formed from a second blank of mesh material, cut to conform to the fabric frame but of dimensions intermediate to those of the inner cut and outer cut of the fabric frame, said central fabric panel being registered to and attached beneath the fabric frame on the adhesive-coated side and adhered thereby applique to a performance fabric substrate in a sandwich configuration.

2. The thermal appliqué according to claim 1, wherein said fabric frame is printed by dye sublimation in a first color.

3. The thermal appliqué according to claim 2, wherein said central fabric panel is printed by dye sublimation in a second color contrasting said first color.

4. The thermal appliqué according to claim 1, wherein said inner and outer cut of the fabric frame are identical but scaled.

5. The thermal appliqué according to claim 1, wherein a width of the inner cut of the fabric frame is at all points smaller than a width of the central fabric panel.

6. The thermal appliqué according to claim 5, wherein the fabric frame may be overlayed atop the central fabric panel leaving a uniform margin of overlap there between.

7. The thermal applique according to claim 6, wherein said uniform margin of overlap is within a range of from 2-4 mm.

8. The thermal applique according to claim 6, wherein said uniform margin of overlap is 3 mm.

9. The thermal applique according to claim 1, wherein a difference between the outer cut and inner cut of the fabric frame is at all points less than a maximum percentage of the total width of the thermal applique.

10. The thermal applique according to claim 9, wherein a measure of a width of the fabric frame comprising said outer cut less said inner cut is less than approximately forty-five percent of a total width of said thermal applique.

11. The thermal applique according to claim 1, wherein said heat activated adhesive layer has a hot melt point within a range of from 250 degrees F.-280 degrees F.

12. A thermal applique, comprising:
    a fabric frame cut from a fabric blank comprising a combination of pure synthetic polyester plus spandex within a range of from 3 to 15%, said fabric frame being cut with an inner cut and conforming outer cut of slightly expanded dimensions, that results in a substantially contiguous border framing a predetermined indicia; a coating of polyurethane adhesive on one side of said fabric frame;
    a central fabric panel formed from a second blank of mesh material, cut to conform to the fabric frame but of dimensions intermediate to those of the inner cut and outer cut of the fabric frame, said central fabric panel being registered to and attached beneath the fabric frame on the adhesive-coated side and adhered thereby applique to a performance fabric substrate in a sandwich configuration;
    a heat-activated adhesive layer laminated to the fabric frame, said heat activated adhesive layer having a thickness within a range of from 50-175 um, a modulus of elasticity within a range of from 3 to 10 Newtons, and a hot melt point within a range of from 175-300 degrees F.

13. The thermal applique according to claim 12, wherein said fabric frame is printed by dye sublimation hi a first color and said central fabric panel is printed by dye sublimation in a second color contrasting said first color.

14. The thermal applique according to claim 12, wherein the fabric frame may be overlayed atop the central fabric panel leaving a uniform margin of overlap there between at all points.

15. The thermal applique according to claim 14, wherein said uniform, margin of overlap is within a range of from 2-4 mm.

16. The thermal applique according to claim 12, wherein a difference between the outer cut and inner cut of the fabric frame is at all points less than a maximum percentage of the total width of the thermal applique.

17. The thermal applique according to claim 12, wherein a measure of a width of the fabric frame comprising said outer cut less said inner cut is less than approximately forty-five percent of a total width of said thermal applique.

18. A method for manufacturing a thermal applique, comprising the following steps:
    a first step of coating a woven fabric blank comprising a combination of pure synthetic polyester plus spandex within a range of 3 to 15% with a layer of polyurethane adhesive having a thickness within a range of between 50-175 um;

a second step of cutting said coated fabric blank with an outer cut and a conforming inner cut to define a fabric frame;

a third step of cutting a second mesh fabric blank with a single cut conforming to said fabric frame with dimensions intermediate to said inner cut and outer cut to define a stretchable central fabric panel;

a fourth step of adhering a laminating layer to one side of said fabric frame;

a fifth step of arranging said central fabric panel atop an underlying performance substrate, and said fabric frame atop said central fabric panel with a margin of overlap around the entire central fabric panel;

a sixth step of laminating the central fabric panel and overlying fabric frame to said underlying performance substrate by said laminating layer until said laminating layer melts through, me central fabric panel to the underlying performance fabric substrate.

19. The method according to claim 18, wherein said fabric frame is printed by dye sublimation in a first color.

20. The method according to claim 19, wherein said central fabric panel is printed by dye sublimation in a second color contrasting said first color.

21. The method according to claim 18, wherein said first step further comprises coating said woven fabric blank with a layer of polyurethane adhesive having modulus of between 3 to 10 Newtons.

22. The method according to claim 18, wherein said second step further comprises cutting said coated fabric blank with an outer cut and a conforming inner cut using a digitally-controlled laser cutting system, further comprising the substeps of cutting said inner cut in a first pass and cutting said outer cut in a second pass.

* * * * *